Patented Nov. 25, 1924.

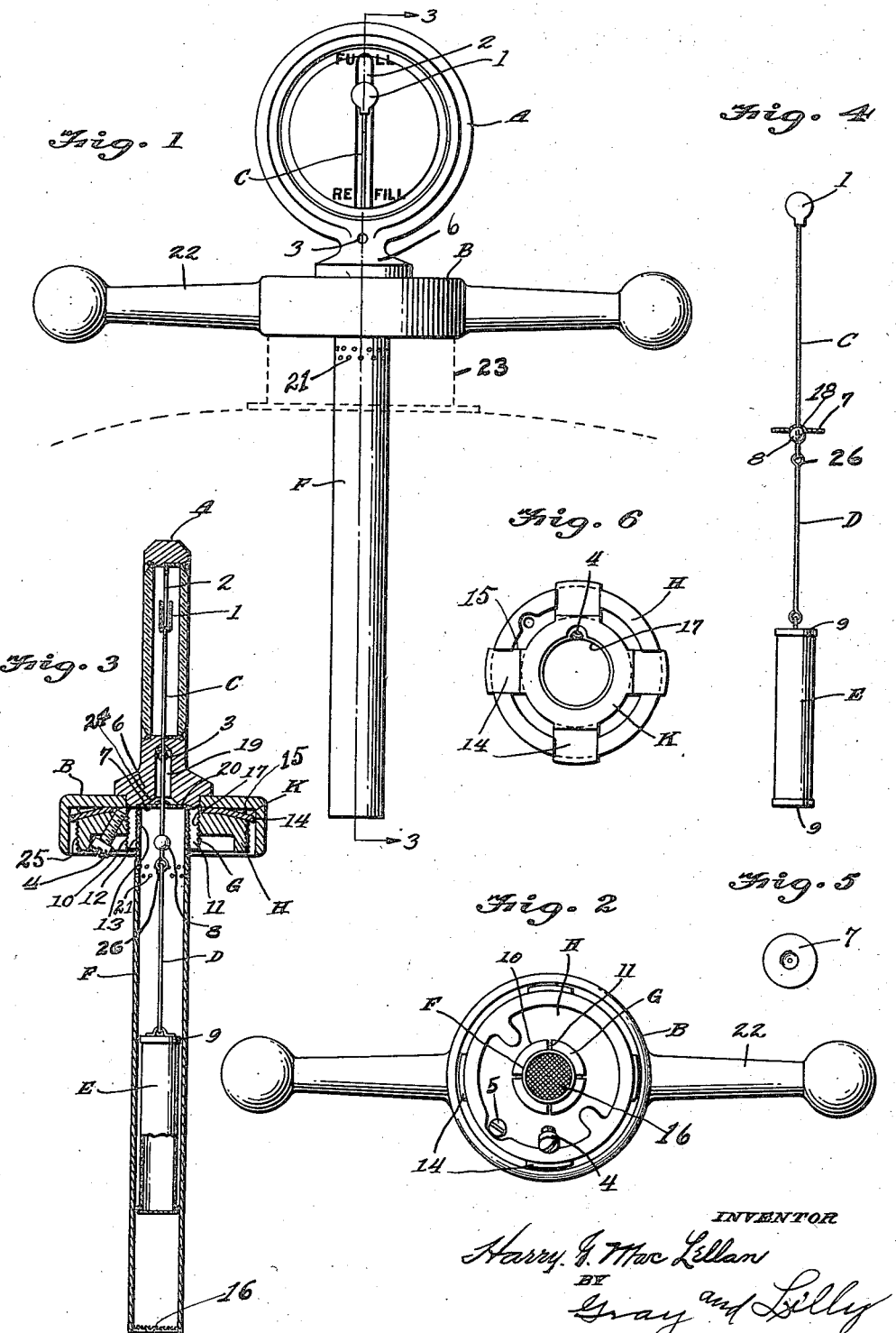

1,516,614

UNITED STATES PATENT OFFICE.

HARRY G. MacLELLAN, OF ANGOLA, INDIANA, ASSIGNOR TO LUTHER J. SEVISON, OF ANGOLA, INDIANA.

WATER GAUGE FOR AUTO RADIATORS.

Application filed October 21, 1921. Serial No. 509,339.

*To all whom it may concern:*

Be it known that I, HARRY G. MACLELLAN, a resident of the city of Angola, in the county of Steuben and the State of Indiana, and a citizen of the United States, have invented certain new and useful Improvements in Water Gauges for Auto Radiators, of which the following is a specification.

My invention has for its object to provide a simple, and effective gauge to be attached to the vertical tube or filler flange of a liquid container such as an auto radiator, though it is evident that its function of indicating the depth of liquid and whether or not the liquid is boiling will be attained when used upon any liquid container.

Specifically my invention has for its object to improve the construction of gauges for the above-named functions by making the position of the usual float carried below the surface of the liquid in the radiator vessel quite independent of the easy movability of the indicator on the dial and of the small stem leading from the float to the indicator. This may be done by making the stem in more than one part and connecting the parts flexibly though positively together, as will later be explained. Another object is the provision of a condensing chamber within the neck of the gauge member just below the dial indicator. Another is the provision of a composite valve for closing the aperture leading to the said chamber, under certain conditions. Another is the provision of an annular set of apertures near the top of the tube containing the float within the said filler flange though above the roof of the radiator receptacle, and the tube having also a screened opening at its bottom, the two openings in the tube permitting a circulation of fluid within the tube to influence the position of the float as is desired. And a still further object is to tighten the gauge upon the filler flange of the radiator through the intermediacy of a spring washer so that the arms on the tightening nut or connected therewith may be left "straight" on the radiator—that is, exactly transverse of the radiator or auto body, without tightening the gauge too much on the supporting flange.

With the above objects in view the invention consists in certain peculiarities of construction and combination of parts as set forth hereinafter with reference to the accompanying drawings and subsequently claimed.

In the drawings:

Figure 1 is a view in front elevation of the gauge, with the outlines of the radiator body and filler flange shown in dotted lines;

Figure 2 is a bottom plan view of the device;

Figure 3 is a sectional view of the assembled device taken on the line 3—3 of Figure 1;

Figure 4 is a detail view of the indicator and float with connecting parts and threaded disc;

Figure 5 is a detail of the metal disc, and

Figure 6 is a plan view of the washer and nut only and shown in their superposed relation.

Similar reference characters refer to similar parts throughout the drawings.

The gauge A has a dial with a vertical slot 2 in which moves an indicator 1 of suitable construction. The gauge member is supported upon a neck or base 6 which is reduced at its lower end to a cylindrical part, the lower end of which is threaded internally and externally for purposes later to be explained. The neck-part has therein a vertical and nearly cylindrical chamber 19 from which lead small apertures up into the dial part, and down into the cylinder.

The lower threaded part of the cylinder forms a hub G which is split into four flange parts separated by vertical slots 11. The inner threads 12 of the hub receives the externally-threaded end 13 of the tube F which is suspended within the radiator and protects therein the delicate parts which influence the indicator in the dial or gauge. The said parts include a cylindrical hollow float E connected with the indicator 1 by means of a sectional rod or wire means, shown as sections C and D linked together at 26 so as to permit flexible but positive action between them.

The neck part of the gauge is perforated with apertures 3 connecting with the chamber 19. The upper end of the tube F is provided near its threaded part with an annular series of openings 21, and the lower end of the tube is covered by a fine wire screen disc member 16 inserted within the lower end of the tube and soldered therein, as shown in Figs. 2 and 3, to prevent the possible entrance of deleterious substances. The float E is closed at its ends by flanged caps 9 whose flanges are outside the cylindrical body of the float, and which thus serve the additional purpose of avoiding unnecessary capillary attraction between the float and the inner wall of the tube F, thus securing a free movement of the float in the tube.

It is to be noted that the usual auto radiator is provided with a filler flange, shown in Fig. 1 by dotted lines and there designated by the numeral 23. This flange has a smooth exterior but a threaded interior, not specifically described here, as it is regarded as more or less conventional. It should, however, be stated that the external threads of the nut H fit the internal threads of such flange 23 to mount the water gauge thereon, as will be explained later; and when mounted in position, the openings 21 are within the filler flange, above the level of the roof of the radiator, and therefore above the level of the liquid therein. This is an important feature—that the opening 16 is immersed, but the upper openings 21 are not, as see Fig. 1.

About the reduced portion of the neckpiece 6 is mounted, by means to be recited later, a casting B which includes an inverted dish-shaped part having a central aperture to be held snugly against the larger neck piece 6, the main body part of the casting having oppositely-directed arms 22 integral therewith. The lower open end of the casting body receives and encloses therein the parts H and K which are superposed, the washer K being in general outline an annulus of spring metal and having radially extending arms 14 which lie in radial slots 15 in the upper face of the annular nut H. The said nut has both internal and external threads, the former 17 engaging the external threads 10 of the split flange or hub G, and the latter threads 25 engaging the internal threads of the filler flange 23. The said washer K is dished somewhat so that it does not lie flat on the face of the nut, but its center bulges upward, when in normal position, so that it strikes the flat inner face of the casting B first, and as the nut is tightened on the hub G, the washer is secured exerting a clamping action on the gauge member 6 on the one hand through the agency of the nut H engaging the hub G, and on the radiator filler flange 23 on the other, though it will be evident that the said force will be a yielding one—between the edge of the said radiator filler flange and the outer ends of the arms or projections 14. See Figure 3.

The nut H is provided with two screws for locking purposes—one, the screw 4 is inclined to the vertical, as shown in Figure 3, and both locks the nut against independent rotation of the washer, and also prevents rotation of the washer and nut together independent of the casting. The screw 5 locks the nut member directly to the casting, but, since the washer and nut are held against rotation because of the parts 14 and 15, all three parts named would be secured by this screw, though the latter is vertical, as see Figures 2 and 6.

There has been found an objection in some constructions of these devices, because the vapor, contacting the outer cooler air at 3, for example, tended to condense and the resulting moisture flooding the apertures through which the wires C and D extended, would thereafter be spirited out through the holes 3 when the steam resulting from the boiling temperature of the liquid in the radiator exerted great pressure so suddenly that no gradual relief was possible. It is now proposed to avoid this objection by providing the chamber 19 as recited heretofore. Then a further provision consists of a very perfect valve mechanism which acts only when the float and indicator rise. This is accomplished by cutting out a conical socket 24 in the lower end of the chamber 19, there being an annular shoulder 20 outside the socket. The valve mechanism is then formed of two parts—7 and 8. The former is a thin metallic disc through a central opening in which the stem section C is threaded. About this hole a conical socket is formed on the under face, so that the resulting protuberance 18 on the upper face will enter the socket 24. The said disc is held normally against the shoulder 20 by the pressure of the upper end of the tube F when the latter is threaded into the hub. The other part of my improved valve for this purpose is the sphere or ball 8 which is threaded upon the section C and then soldered thereon in proper position. Any upward movement of the stem sections will then move the sphere against the socket in the disc and close the opening upward tightly. The ball therefore always rises with the stem but the disc member remains up against the part 6.

Operation: The gauge parts include the stem section C dangling below the base or neck. In assembling the gauge, the lower section D of the stem is linked to the other section after the ball 8 has first been soldered on. The float having first been secured to the lower end of the stem, and the casting B enclosing therein the washer K and nut H in proper superposed relation having been as a unit threaded over the hub part of the neck or base, the stem and float are fitted into the tube, after which the tube is screwed into the hub against the valve and base.

The gauge is then mounted as a whole on the radiator by threading the nut H within the filler flange 23 thus securing all parts in assembled relation. It is to be noted in this connection that the outer threads 10 of the hub G are left hand threads, being thus opposite to the external threads 25 on the nut, so that the indicator or gauge can be removed easily from the radiator.

Normally the liquid will rise through the screen 16 lifting the float and thereby the indicator also in the dial, serving to show the driver that the radiator is full. As the liquid is lost by evaporation or otherwise, the dial will gradually fall. When the temperature of the liquid rises to that of boiling water, a constant circulation from the opening 16 to the openings 21 which are not immersed in the liquid will occur much like that in a coffee percolator. This causes the float to suddenly rise and fall in successive vibrations and with it the indicator, thus warning the driver that the heat in the radiator is too great for proper circulation.

From this explanation it will be seen that the positive, though rather flexible connection between the float and the indicator, permits the exertion of an upward force by the float, even when the latter is not in exact alinement with the indicator stem, as when the radiator is not level, as during the descent of a car down a steep grade. By this improvement either an upward or downward force can be exerted by the float through the agency of the sectional stem acting from any angle at all likely to occur and without binding against the walls of the passage, and thus insure accurate registration of the conditions upon the dial. This universal jointed stem leading from the float to the indicator is regarded as a matter of very great importance, because of the delicacy of the parts and the necessity for positive exact information based on so slight actuation.

The above-mentioned certainty of action arises also in part from the positive circulation of the liquid through the tube lengthwise because of the apertures in both ends of the latter which permit, especially when the water is boiling, the free circulation through the tube and thus actuating the float as above explained. Without the provision of the upper openings in the tube F the fluctuation of the float in the tube is not nearly so perceptible.

The condensing chamber arranged above the valve is also a feature arrived at after careful experimentation and use of different types of valves, and which was found to make possible the closing of the valve tightly when desirable, and yet to permit accumulation therein of condensed steam without permitting steam force to destroy the delicate action of the float desired.

The superposed washer and nut are especially valuable in positioning the arms of the device transversely of the car or radiator. When the gauge is to be mounted on the tubular pipe or cylinder 23 projecting from the radiator, which part I have elsewhere termed the filler flange, the latter will normally extend into and fit accurately the space between the nut H and the inner surface of the casting flange B. It is quite likely, without the provision of the applicant's heavy spring warped or dished washer K, that the point of proper tightening of the nut will happen to be reached while the arms are in alinement with the car body, which is quite undesirable. With the use of this washer as explained however, the spring ends are reached by the top edge of the flange 23 at this point rather than the unyielding casting wall, and therefore the screwing of the nut may be continued without undue strain on the gauge or its hub, until the arms are in the angular position desired—which will be transverse of the car body. The latter tightening of the screw merely flattens the spring without injury to any of the parts.

It is to be understood that I do not limit the invention to the details of the construction herein shown, as I am aware that many changes may be made without departing from the spirit of the invention; For example, the stem may be made in any number of sections, or some other manner of registering the record on the dial may well be used without avoiding the improvement herein disclosed.

Having thus described my invention, what I claim as new and desire to secure by Letters Patent, is:—

1. A dial plate, an indicator movable in co-operative relation with the dial, a base adapted to be mounted on a liquid container, a chambered neck above the base and supporting the dial plate, the chamber having small end openings and vent openings through its sides, a tube extending downwardly from the base, a float within the tube, and means passing through the end openings of the neck chamber and connecting the float and indicator.

2. A dial plate, an indicator movable in co-operative relation to the dial, a base adapted to be mounted on a liquid container, a chambered neck above the base and supporting the dial plate, the chamber having small end openings and lateral vent openings, a tube extending downwardly from the base and having its lower end adapted to communicate freely with the liquid in the container and having small lateral apertures above the normal level of the liquid in the container, a float within the tube, and a connector comprising an upper section connected to the indicator and guided through the end openings of the neck chamber and a lower section flexibly jointed to the upper section and connected to the float.

3. A dial plate, an indicator movable in co-operative relation to the dial, a base adapted to be mounted on a liquid container, a chambered neck above the base and supporting the dial plate, the chamber having small end openings and lateral vent openings, a tube extending downwardly from the base and having its lower end adapted to communicate freely with the liquid in the container and having small lateral apertures above the normal level of the liquid in the container, a float within the tube, a connector passing loosely through the end apertures of the neck chamber and connecting the indicator and the float, and means on the connector for sealing the lower end of the neck chamber when the connector is raised to a certain position.

4. A liquid gauge for auto radiators comprising a dial plate, an indicator registering on the dial and a hollow cylindrical element hanging in the liquid container and enclosing loosely therein means for actuating the indicator, means for connecting the actuating means with the indicator, a base for said plate having an opening for the passage of said connecting means therethrough, said connecting means being composed of slender sections linked together to permit flexible and angular movement therebetween so that impulses may be efficiently effected in either direction between the actuator and the indicator and at any angle of thrust, and valve means fixed on one of said sections for closing said opening in the base when the actuating means rises.

5. In a liquid gauge for auto radiators, comprising a dial, a dial supporting plate having an apertured, threaded extension, an indicator registering upon the dial, said dial support having a hollow cylindrical tube adapted to be suspended within a liquid container whose depth and movement of liquid is to be registered, the said tube enclosing a float and having a screened opening in the bottom end and a series of openings near the top thereof whereby a circulation of fluid is afforded within the tube, and the float thus moved or agitated vertically in accordance with the surface of the liquid in the container, an annular supporting nut threaded interiorly and exteriorly, engaging said extension by its inner threads and the radiator flange by its exterior threads, and means passing through said aperture for connecting the indicator and the float, substantially as set forth.

6. A liquid gauge for auto radiators comprising a dial, a dial supporting plate having an apertured annular extension threaded interiorly and exteriorly, an indicator for registering upon the dial, a hollow cylindrical tube threaded into said annular extension adapted to be suspended within a liquid container whose depth and movement of liquid is to be registered, the said tube having a threaded upper end adapted to fit the interior threads of the said extension, a screened opening in the bottom end and a series of openings near the top thereof whereby a circulation of fluid is afforded within the tube, an annular supporting nut threaded interiorly and exteriorly, engaging said extension by its inner threads, and the radiator flange by its exterior threads, and actuating means enclosed in said tube and having positive connection with said indicator through said aperture whereby the cator through said aperture will move or agitate said liquid circulation will move or agitate the said actuating means in accordance with the surface of the liquid in the container.

7. A liquid gauge for auto radiators comprising a gauge head including a base and a dial, an indicator for registering upon the dial, a float connected with the indicator and suspended below said dial within a liquid container whose depth and movement of liquid is to be registered, a slender stem connecting the float and indicator, there being a passage leading up through the base of the gauge head and through which the stem passes the lower end of said passage being hollowed out to provide a conical seat in its lower face, a thin metallic apertured disc threaded upon the said stem and having a protuberance on its upper face to fit the seat of the said passage and the said disc having a corresponding socket on its lower face, a relatively small sphere secured upon the said stem below the disc whereby the upward movement of the former will by engagement of the disc socket securely close the passage opening when the float rises and open the opening when it falls, and means for enclosing the said float permitting loose vertical movement thereof within the enclosure.

8. A liquid gauge for auto radiators comprising a dial plate, an indicator for registering upon the dial, an actuating stem for said indicator, said plate having a supporting base which is longitudinally apertured for the passage therethrough of said stem and having on its under face a flanged hub part which is screw-threaded without, a vertical tube member enclosing actuating means for the indicator through the intermediacy of the stem and having means for engaging the said hub, a nut element having screw threads within and without, the former adapted to engage said threads of the hub and the latter adapted to engage the inner threads of the filler tube of the usual radiator on an auto, the said nut member being further provided on its face with radial slots whose depth increases from the center of the nut, and a heavy spring dished washer having an annular part and radially extending arms fitting the beforesaid slots when these two parts are superposed and said arms extending beyond the periphery of the nut so that the edge of the filler tube engages the ends of the arms before engaging the rigid parts of the device, and a casting comprising a circular flanged inverted dish-shaped piece and having manually-engageable arms extending therefrom, said piece having a circular opening at its center to receive the said hub loosely therein and the main flanged part adapted to receive therein the said nut and washer in spaced relation from the said casting whereby, when assembled, the entire device may be turned as a unit by operating the casting arms to mount the gauge on a radiator.

9. A water gauge for auto radiators comprising a head having a supporting base with a lower part provided with an externally-threaded hub, a nut having inner screw threads adapted to engage the hub and external threads for engaging the threads of a filler tube of a radiator, the said nut being further provided on its upper face with radial slots whose depth increases from their center, and a heavy warped spring washer including an annular part and radially extending arms fitting the said slots when the two parts are superposed and said arms extending beyond the periphery of the nut so that the edge of the filler tube engages the ends of the arms before reaching the rigid parts of the device, a casting having a flanged part to receive therein the said nut and washer whereby, when assembled, the entire device may be turned on its axis as a unit by operating the casting to mount the gauge on a radiator.

10. In a liquid gauge for auto radiators, the combination of an indicating element, a supporting base therefor, there being a vertical elongated chamber within said base, said chamber being connected with the outer air by vent openings and said base being supported by a cylindrical part which is tubular and is a reduced lower end of said base, said cylindrical part forming a hub threaded internally and externally and rendered radially yieldable by being split into a plurality of flange parts separated by vertical slots, said chamber being connected with said indicating element and said tubular part by reduced openings, tubular means beneath said base having a threaded upper end engaging the inner threads of said hub, an annular nut having inner threads engaging the said hub and outer threads engaging the supporting flange of an auto radiator, and float actuated means passing axially through the hub, the said chamber and its reduced openings for operating said indicating element, substantially as set forth 11. Valve mechanism for opening and closing automatically the opening between the actuator and indicator of an auto radiator gauge, comprising a slender connecting means, a sheet metal apertured disc having an upwardly extending protuberance about the aperture and fitting into said opening, there being a corresponding socket on its lower face, and a sphere fixed to said connecting means fitting said socket, whereby the said opening will be closed or opened as the said connecting means rises or falls, substantially as set forth.

12. A water gauge for auto radiators comprising a head and a supporting hub, a casting loosely fitting upon said hub and an annular flanged part, an annular nut having inner screw threads for engaging the said hub and outer threads for engaging the threaded part of the filler flange of an auto radiator, a screw element for locking the nut and casting together, whereby when assembled, the entire unit may be turned on its axis by operating the casting, to mount the gauge on the filler tube of a radiator, the nut, in such assemblage, being within said filler tube and the casting flange without it, substantially as set forth.

13. An indicator for a receptacle having an internally threaded flange, comprising indicating means, a base for the indicating means, a hub depending from the base, a handled collar fitting loosely on the hub below the base, an annular nut threaded onto the hub below the collar, binding the collar against the base, and having external threads adapted to engage the internal threads of said receptacle flange, the internal and external threads of said annular nut being opposite handed, and means depending from said base and adapted to operate the indicator when the device is in position on the receptacle.

14. A gauge for automobile radiators including a dial plate in a dial chamber and a support therefor, a base member for the gauge, and a tubular neck member forming a connection between the dial chamber and support and affording a passageway from the radiator to the dial chamber and said tubular neck having a vent opening through its side open to the atmosphere.

15. A gauge for automobile radiators including a dial plate in a dial chamber and a support therefor, a connection between the dial chamber and support having a passage therethrough affording communication between the dial chamber and radiator when the gauge is in place thereon, an indicator within the dial chamber, a float member below the dial chamber and support, a connecting member between the float and indicator extending through the passage to the dial chamber, and means on said connecting member for closing said passage to the dial chamber when said float and indicator are elevated.

In testimony whereof I hereunto affix my signature.

HARRY G. MacLELLAN.